US 8,419,897 B2

(12) United States Patent
Bowles et al.

(10) Patent No.: US 8,419,897 B2
(45) Date of Patent: Apr. 16, 2013

(54) METHOD FOR PRODUCING CRUDE TALL OIL BY SOAP WASHING WITH CALCIUM CARBONATE REMOVAL

(75) Inventors: Robert E. Bowles, Lynn Haven, FL (US); C. Douglas Foran, Savannah, GA (US); Joseph H. Griffin, Rincon, GA (US); F. Edwin Swann, Savannah, GA (US)

(73) Assignee: Arizona Chemical Company, LLC, Jacksonville, FL (US)

( * ) Notice: Subject to any disclaimer, the term of this patent is extended or adjusted under 35 U.S.C. 154(b) by 0 days.

(21) Appl. No.: 13/302,471

(22) Filed: Nov. 22, 2011

(65) Prior Publication Data

US 2012/0123087 A1    May 17, 2012

Related U.S. Application Data

(63) Continuation of application No. PCT/US2011/051137, filed on Sep. 10, 2011.

(60) Provisional application No. 61/381,603, filed on Sep. 10, 2010, provisional application No. 61/448,893, filed on Mar. 3, 2011.

(51) Int. Cl.
*D21C 11/00* (2006.01)
*C11B 13/00* (2006.01)

(52) U.S. Cl.
USPC .............................. 162/16; 530/205; 530/208

(58) Field of Classification Search ............... 162/16; 530/205, 208
See application file for complete search history.

(56) References Cited

U.S. PATENT DOCUMENTS

| | | | |
|---|---|---|---|
| 2,143,345 A | 1/1939 | Frankel et al. | |
| 2,296,952 A | 9/1942 | Ross et al. | |
| 2,324,012 A | 7/1943 | Mitchell | |
| 2,363,694 A | 11/1944 | Ross et al. | |
| 2,371,307 A | 3/1945 | Mitchell | |
| 2,389,284 A | 11/1945 | Turck et al. | |
| 3,575,952 A | 4/1971 | Morris et al. | |
| 4,005,060 A | 1/1977 | Mannbro | |
| 4,142,967 A * | 3/1979 | Fremont | 530/205 |
| 4,154,725 A * | 5/1979 | Otrhalek et al. | 530/208 |
| 4,238,304 A * | 12/1980 | Zucker | 205/696 |
| 4,248,769 A | 2/1981 | Johansson | |

(Continued)

OTHER PUBLICATIONS

International Search Report and Written Opinion dated Nov. 7, 2011 as issued in PCT/US2011/051137, filed Sep. 10, 2011.

(Continued)

*Primary Examiner* — Liam Heincer

(57) ABSTRACT

A method for producing crude tall oil from black liquor soap while removing calcium carbonate and lignates is disclosed. Black liquor soap is first combined with an alkaline ash medium having a lower concentration of lignates and inorganic solids than the black liquor soap, to form washed tall oil soap, fortified brine, lignates, and calcium carbonate. The washed tall oil soap is then separated from the fortified brine, lignates, and calcium carbonate, by centrifugation, decantation, filtration, settling, or a combination of these techniques. Acidification of the washed tall oil soap gives crude tall oil and a spent acid mixture. The crude tall oil is separated from the spent acid. The spent acid is made alkaline, and at least a portion of it is returned for use as alkaline wash medium. The method avoids accumulation of calcium sulfate in acidulation units.

14 Claims, 13 Drawing Sheets

U.S. PATENT DOCUMENTS

| | | | | |
|---|---|---|---|---|
| 4,299,652 | A | * | 11/1981 | Masuno et al. ............ 162/30.11 |
| 4,524,024 | A | * | 6/1985 | Hughes ........................ 530/205 |
| 4,879,369 | A | * | 11/1989 | Force ........................... 530/205 |
| 5,164,480 | A | | 11/1992 | Huibers et al. |
| 5,733,461 | A | * | 3/1998 | Bleakley et al. .............. 210/712 |
| 5,898,065 | A | * | 4/1999 | Aitta et al. .................... 530/205 |
| 6,090,240 | A | * | 7/2000 | Eneberg et al. .............. 159/47.3 |
| 6,165,316 | A | * | 12/2000 | Iivonen et al. ................. 162/16 |
| 6,297,353 | B1 | * | 10/2001 | Fuenzalida Diaz et al. .. 530/205 |
| 6,348,566 | B1 | * | 2/2002 | Sarasto ........................ 530/205 |
| 6,409,882 | B1 | * | 6/2002 | Hayden ........................... 162/14 |
| 7,084,238 | B2 | * | 8/2006 | Kjellberg ..................... 530/205 |
| 2002/0117455 | A1 | * | 8/2002 | Moghe et al. ................ 210/723 |
| 2003/0075290 | A1 | * | 4/2003 | Thompson et al. ............. 162/29 |
| 2003/0221804 | A1 | * | 12/2003 | Lightner ......................... 162/16 |
| 2009/0113786 | A1 | * | 5/2009 | Lindstrom et al. ............. 44/308 |
| 2009/0227767 | A1 | * | 9/2009 | Sellerholm et al. ........... 530/209 |
| 2011/0049012 | A1 | * | 3/2011 | Stigsson et al. ................ 208/88 |
| 2012/0088943 | A1 | * | 4/2012 | Knuuttila et al. ............. 585/310 |

OTHER PUBLICATIONS

Krumbein, J.P., Efficient Tall Oil Plant Can Benefit Kraft Mills, Southern Pulp & Paper, Aug. 1984 pp. 36-38.

Vuorikari, Olavi, The Occurrence of Foreign Cations in Black Liquor, Soap and Tall Oil Acidulation Systems, Naval Stores Review, Jul./Aug. 1992 pp. 4-10.

* cited by examiner

METHOD FOR PRODUCING CRUDE TALL OIL BY SOAP WASHING WITH CALCIUM CARBONATE REMOVAL

FIELD OF THE INVENTION

The invention relates to the production of crude tall oil from black liquor soap, and particularly to a method that removes calcium and lignates with an alkaline wash.

BACKGROUND OF THE INVENTION

Tall oil is an important by-product of the Kraft process for pulping wood, especially wood derived from pine trees. It is usually seen as a resinous, oily liquid and comprises a mixture of rosin acids and fatty acids and may be used in soaps, emulsions, lubricants, fuels and in other applications.

One important, less refined form of tall oil is referred to as CTO (crude tall oil). CTO contains rosins, unsaponifiable sterols, resin acids (such as abietic acid), fatty adds (such as palmitic, oleic and linoleic adds), fatty alcohols, other sterols, and other alkyl hydrocarbon derivatives.

The fatty add fraction of tall oil is referred to as TOFA (tall oil fatty adds) and is of significant interest in many applications such as in production of soaps and lubricants. Many TOFA chemical derivatives (such as esters) are useful in important applications as well. Other components of CTO, such as tall oil rosin, certain sterols, and so forth, are valuable for other uses.

Crude tall oil is obtained by separating black liquor soap from black liquor obtained from the Kraft process. A black liquor soap (or tall oil soap) is separated from the black liquor, and further processed by acidulation. Acidulation of tall oil soap is treatment with a mineral acid, for example sulfuric acid, to yield a CTO stream and a "spent acid" stream. Washing this black liquor soap prior to acidulation is thought to allow more efficient separation of CTO after acidulation; alkaline tall oil plant brine has been employed as the washing medium. This alkaline tall oil plant brine is produced by adjusting the pH of the spent acid.

However, such efforts to wash black liquor soap to improve CTO separation have been complicated by the presence of too much lignin (or lignates depending on the pH)

The presence of too much lignin in the washed soap was believed to cause problems later in separating out CTO after acidulation, and the presence of lignin is undesirable in tall oil. Thus, efforts were made to remove lignin from the soap during washing. Lignin has sometimes been used as a fuel source.

Additionally, calcium sulfate builds up in systems using soap washing. This build-up is likely due to unrecognized calcium in alkaline tall oil plant brine used as wash medium. We have found that fortified brine (sometimes called extract brine or wash filtrate) resulting from washing tall oil soap, carries calcium species with it. When the fortified brine is sent to a weak liquor system (as is commonly done), concentration of the weak liquor would cause calcium to build up there, and return to the black liquor soap feed system. This in turn increases calcium sulfate formed during acidulation.

Calcium sulfate build-up is very undesirable; if left unchecked, calcium sulfate plugs process equipment. In systems using gravity settling or decanting downstream from acidulation, calcium sulfate accumulation makes it necessary to shut decanters down frequently for cleaning. In continuous processing, where centrifuges separate out lignin and inorganic solids, large amounts of calcium sulfate also require shutdown to clean the system. Therefore, calcium sulfate issues appear to have caused soap washing to be abandoned by most, if not all, applicable industry. In addition, the lignin and insoluble inorganics entrain crude tall oil during separation, reducing the efficiency of such systems.

U.S. Pat. No. 3,575,952 describes a process to wash crude tall oil soap with alkaline tall oil plant brine for the purpose of removing lignin. There is no teaching regarding calcium deposits. This patent teaches that the brine should be at a pH of at least about 8 and preferably 10-14.

U.S. Pat. No. 4,248,769 describes a process to wash crude tall oil soap with an alkaline tall oil plant brine in order to remove lignin, where the wash mixture is cooled from 60-80° C. to 35-50° C. (140-176° F. to 95-122° F.). There is no teaching regarding calcium deposits.

U.S. Pat. No. 5,164,480 describes an electrolytic tall oil soap acidulation process. It discloses that lignates and calcium ions at too high a level may interfere with the process, so pretreatment of the soap is recommended. The pretreatment method is not detailed. There is mention that pretreatment may comprise precipitation, filtration, or precipitation and filtration. In any case, it is "some" (apparently a quite low level of) calcium ions present in the soap and not an insoluble calcium compound (at any level, much less a high level) that is described or of concern here. See, for example, the discussion on the presence of calcium carbonate in the soap given below.

Krumbein ("Efficient Tall Oil Plant Can Benefit Kraft Mills," *Southern Pulp and Paper*, August 1984, pp. 36-38) discusses reasons for tall oil soap washing. Although the process described does address removal of lignin and to a limited extent the direct removal of calcium sulfate. However, one skilled in the art would recognize that this process would result in calcium increasing by the fortified brine going to a weak liquor system that returns black liquor to the wash process. Clarification of fortified brine is not discussed.

Vuorikari ("The Occurrence of Foreign Cations in Black Liquor, Soap and Tall Oil Acidulation Systems," *Naval Stores Review*, July/August 1992, pp. 4-10) describes a process similar to that in U.S. Pat. No. 4,248,769 (see above) and provides much discussion as to calcium compounds in some systems. It states that soap washing with alkaline tall oil plant brine will not effectively remove calcium when alkaline plant brine is used as the wash medium. There is no mention of clarification of fortified brine, but there is some discussion of where unclarified fortified brine may be sent in the black liquor system.

As mentioned previously, tall oil may be used as a fuel component. WO 2009/131510 describes washing tall oil to remove lignin and calcium soaps prior to using the tall oil in diesel fuel. It teaches that this washing is needed to remove lignin and calcium soaps remaining after acidulation of tall oil soap that then end up in the CTO. These contaminants in the CTO interfere with catalysts used in making diesel.

There is a need for improved methods of making tall oil and associated materials. In particular, in a process for converting black liquor soap to crude tall oil, there is a need for method of removing insoluble calcium and calcium carbonate and lignin from black liquor soap, while improving the yield of CTO from black liquor soap. Removing calcium carbonate will reduce calcium sulfate formation in an acidulation process that uses sulfuric acid. This, in turn, will reduce the amount of calcium sulfate cycling back into a wash medium for washing black liquor soap. Removing insoluble inorganics and lignin will improve the yield of CTO from black liquor by reducing entrained CTO in a spent acid stream coming from an acidulation process, and by reducing inefficiencies caused by deposits on process equipment.

SUMMARY OF THE INVENTION

Our invention relates to a method for producing crude tall oil from black liquor soap while removing calcium and lignates. The first step of the method comprises combining black liquor soap, comprising tall oil soap, lignates, and inorganic solids (including calcium carbonate), with an alkaline wash medium at a temperature within the range of 25° C. to 100° C. The alkaline wash medium has a pH from 10 to 14 and a lower concentration of lignates and inorganic solids than the black liquor soap. The resulting mixture comprises washed tall oil soap, fortified brine, lignates, and calcium carbonate. The next step of our method is to separate the tall oil soap from the fortified brine, lignates, and calcium carbonate, by centrifugation, decantation, filtration, settling, or a combination of these techniques, or other techniques in the art. The next step of the method is acidulation of the tall oil soap to form crude tall oil, which is isolated, and a spent acid mixture. The next step of the method is to adjust the pH of the spent acid to pH=10 to 14 to form an alkaline brine. Optionally, at least a portion of the alkaline brine is returned for use as alkaline wash medium.

We surprisingly found that, in a method for producing crude tall oil from black liquor soap, black liquor soap can be successfully washed with an alkaline medium while avoiding process upsets caused by calcium sulfate accumulation in, or downstream from, an acidulation unit. Separation of washed tall oil soap from fortified brine, lignates, and calcium carbonate and isolation of calcium carbonate and lignates from the fortified brine prevents calcium and lignate accumulation when the brine is recycled to the plant's weak liquor system.

BRIEF DESCRIPTION OF THE DRAWINGS

Although the figures are not required for understanding the invention, they are included here to help highlight different aspects. FIGS. 1-6 are described in the example. An figures are mere illustrations and are not intended to limit the scope of the claimed subject matter.

DETAILED DESCRIPTION OF THE INVENTION

Figure 1:
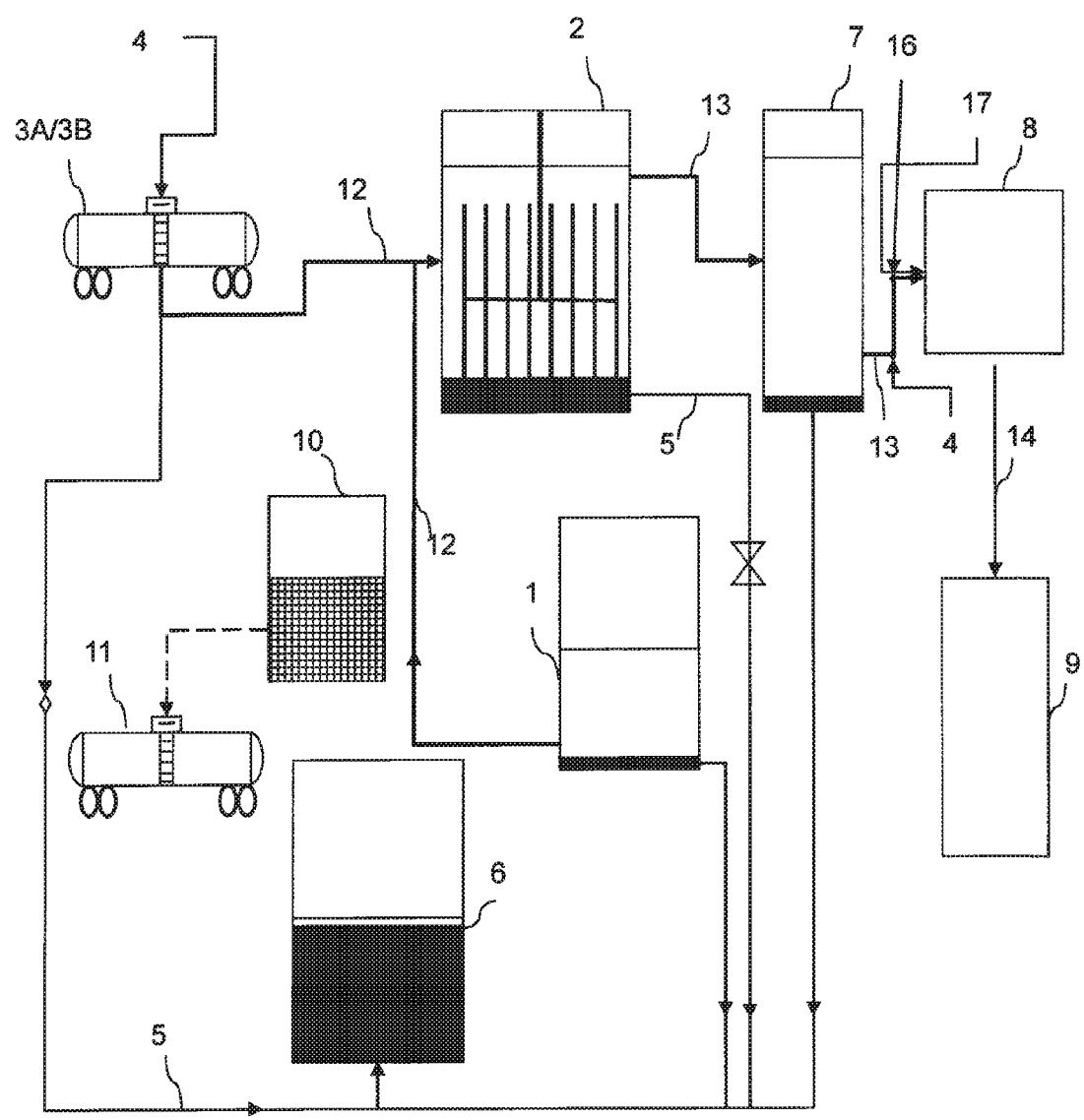
FIG. 1 depicts a schematic of a of a baseline process consistent with (Comparative) Example 1.

Our invention relates to a method for producing crude tall oil from black liquor soap while removing calcium and lignin/lignates. Black liquor soap is washed with an alkaline wash media to form a tall oil soap portion and a fortified brine portion (also called extract or wash filtrate), containing lignin or lignates, and insoluble inorganic species, including calcium carbonate. Tall oil soap is then separated from fortified brine, lignates, and calcium carbonate. Optionally, calcium carbonate and lignates are isolated from fortified brine. With this option, the fortified brine (containing black liquor) can be recycled to a weak liquor system without allowing calcium or lignate deposits to accumulate. Deposits of calcium and lignates can cause costly shutdowns to clean equipment.

Black liquor soap used for the inventive method, as a by-product of the Kraft process, is conveniently obtained directly from paper mills as a by-product. "Kraft plant" refers to a location where the Kraft process itself is run, including its liquor systems, but does not include tall oil processing (such as tall oil soap washing and acidulation). Suitable black liquor soap can come from a single mill, but it is more often a composite from multiple mill sources. The content of the soap varies, but contains crude tall oil soap, water, calcium carbonate, lignates, and entrained black liquor.

As previously discussed, prior art methods for tall oil production have not been effective in controlling calcium sulfate levels when using soap washing. Calcium carbonate present in black liquor soap reacts with sulfuric acid used in acidulation to produce calcium sulfate, which can eventually plug equipment. The inventive method avoids process complications caused by calcium sulfate precipitation by removing calcium carbonate before it can be converted to the sulfate in the acidulation step.

In the first step of our method, black liquor soap is washed (combined) with an alkaline wash medium. The alkaline wash medium has a pH from 10 to 14, preferably from 10 to 13. The particular pH range used will depend on the desired outcomes for calcium removal, lignates removal, crude tall oil yield, higher heating values of the fortified brine, and other factors. Importantly, the alkaline wash media also has a lower concentration of lignates and inorganic solids than the black liquor soap. The black liquor soap and alkaline wash medium are combined at a temperature within the range of 25° C. to 100° C. The resulting mixture comprises washed tall oil soap, fortified brine, lignates, and calcium carbonate. Washed tall oil soap is separated from the fortified brine, lignates, and calcium carbonate. Acidification of the washed tall oil soap gives crude tall oil, which is isolated, and a spent acid mixture. The spent acid mixture is adjusted to pH=10 to 14 and at least a portion of it is returned to the first step for use as alkaline wash medium.

The alkaline wash medium is preferably an aqueous process stream from the plant. Conveniently, the alkaline wash medium is generated by neutralizing spent sulfuric acid from an acidulation process. The spent acid mixture is neutralized with sodium hydroxide or another strong base to give the alkaline wash medium. The alkaline wash preferably has a low content of suspended solids, a low content of tall oil, and dissolved sodium sulfate resulting from neutralization. The alkaline wash medium is also referred to as "clean alkaline brine," "alkaline tall oil plant brine," "alkalized spent acid," "neutralized spent acid," or similar terms. We have found that, when the desire is to maximize calcium removal, the pH of the alkaline wash medium is preferably from 11 to 13, more preferably from 11.5 to 13. When optimizing CTO yield a pH within the range of 10 to 12, or from 10.0 to 11.5 is useful.

The alkaline wash medium has a lower concentration of lignates and inorganic solids than the black liquor soap, as one objective of soap washing is to lower the content of these materials in the tall oil soap. Preferably, the lignates content of the alkaline wash medium is less than 1.0 wt. %, more preferably 0.01 to 0.9 wt. %. The level of filterable inorganic solids in the alkaline wash medium is preferably less than 200 ppm, more preferably 10 to 175 ppm.

The amount of alkaline wash medium used will depend on whether it is more desirable to maximize calcium removal, lignates removal, tall oil yield, or other factors. Preferably, however, the amount of alkaline wash medium is within the range of 1 to 60 wt. %, more preferably 10 to 50 wt. %, and most preferably 10 to 40 wt. % based on the combined amounts of black liquor soap and alkaline wash medium. For maximum calcium removal, 25 to 40 wt. % is preferred. For maximizing the yield of crude tall oil and minimizing acid consumption during acidulation, a lower proportion of alkaline wash medium, e.g., 10 to 25 wt. % based on the combined amounts of black liquor soap and alkaline wash medium, may be more desirable.

The black liquor soap and alkaline wash medium are combined at a temperature within the range of 25° C. to 100° C. (77-212° F.), preferably from 55 to 95° C. (131-203° F.), and more preferably from 55 to 80° C. (131-176° F.).

The residence time for the washing process is up to 72 h, or 8 to 40 h, or 8 to 24 h. These times are approximate and may be reduced with improved mixing or separation techniques.

The mixture resulting from the combination of the black liquor soap and alkaline wash medium comprises washed tall oil soap, fortified brine, lignates, and calcium carbonate. Washed tall oil soap is separated from the fortified brine, lignates, and calcium carbonate. Separation of the washed tall oil soap can be accomplished by any desired technique, including centrifuging, decanting, filtering, settling, their equivalents, or combinations of these. The separation methods provide, in one or more steps, the washed tall oil soap, a solid phase comprising calcium carbonate, and a liquid phase comprising fortified brine.

"Fortified brine" is filtrate (washings) or at least a major component of filtrate that results from black liquor soap washing. It is sometimes called tall oil soap wash filtrate, wash filtrate, or extract brine. Fortified brine usually has a relatively high lignate and/or energy content compared to the alkaline wash medium (hence, "fortified"). It may be clarified and still be considered fortified brine. Usually, fortified brine is the liquid phase that remains after solids comprising calcium carbonate have been removed. The solids comprise mostly calcium carbonate but may also include a minor proportion of undissolved lignates.

Suitable centrifuges useful for performing the required separation include scroll-type (decanting) centrifuges and ejecting-disc stack types, such as those manufactured by Alfa-Laval and others. Centrifugation can employ more than one type of centrifuge. Decanting centrifuges are useful for removing most of the solids ahead of ejecting-disc stack centrifuges, if both types are employed.

Ejecting-disc stack centrifuges can be used to separate solids and two liquid phases from each other in a single, continuous process using high centrifugal force. Denser solids are forced outward against the rotating bowl wall, while the less-dense liquid phases form concentric inner layers. The liquid-liquid interface position is adjusted to ensure that the separation takes place with maximum efficiency. The disc stack in an ejecting type centrifuge produces two clarified liquid phases that overflow close to the rotating axis, in the outlet area on top of the bowl. The liquid phases then flow into separate chambers. Each separated liquid phase then leaves the bowl due to the force of gravity or by means of a paring disc, which is a special pumping device. The chambers are isolated from each other to prevent cross-contamination.

In this invention, because insoluble calcium carbonate has been separated from the fortified brine, a fortified brine that has reduced calcium content compared with the black liquor soap can be returned to a weak black liquor system. This avoids build-up of calcium carbonate (and potential fouling) in the plant's black liquor inventory and evaporation system. It also helps to avoid shutdowns or down time due to calcium sulfate precipitation further downstream in the acidulation unit.

Figure 11:
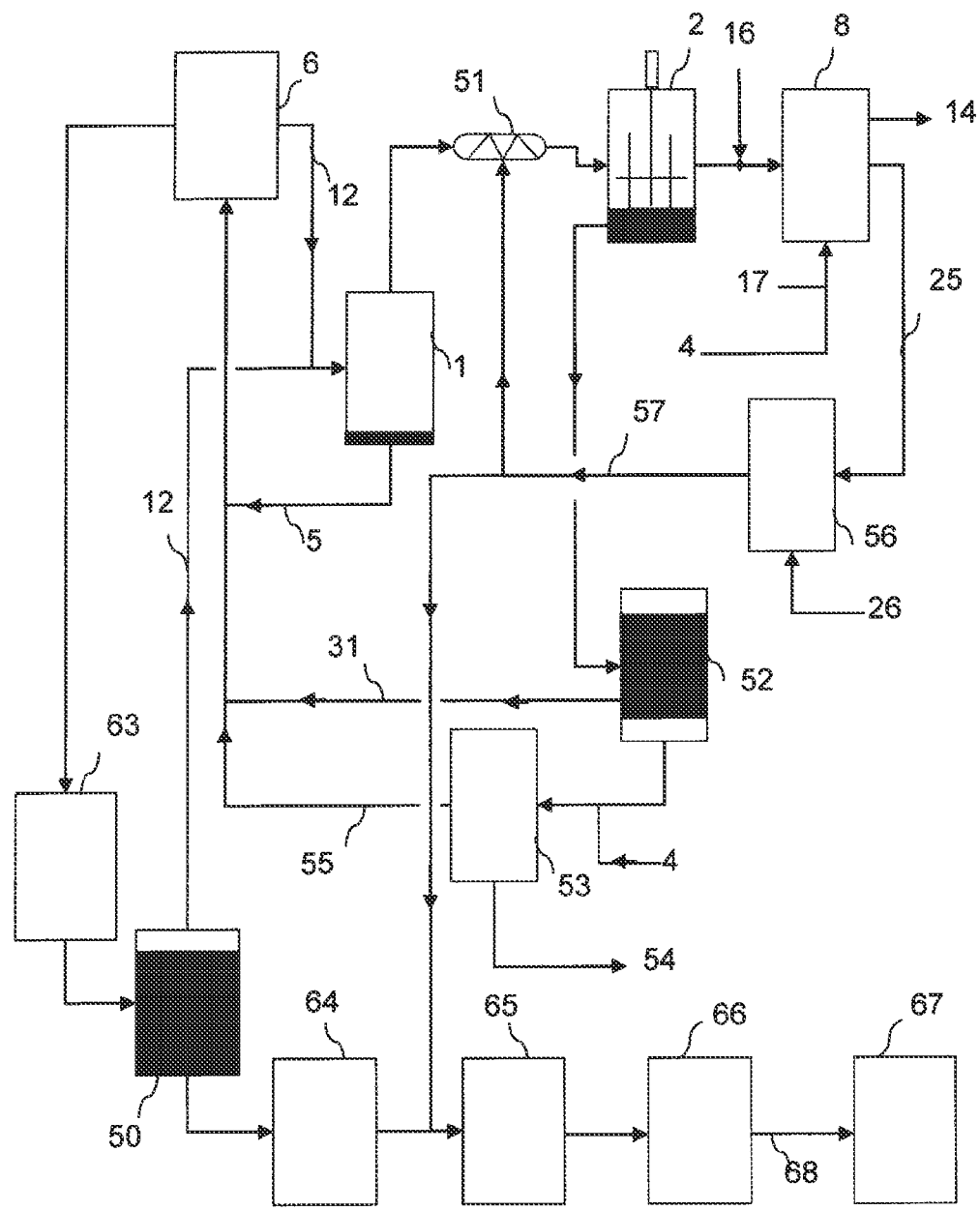
FIG. 11 depicts a black liquor soap washing process with fortified brine clarification where the clarified fortified brine is sent to weak black liquor storage, which is consistent with at least one embodiment of the invention.
Figure 12:
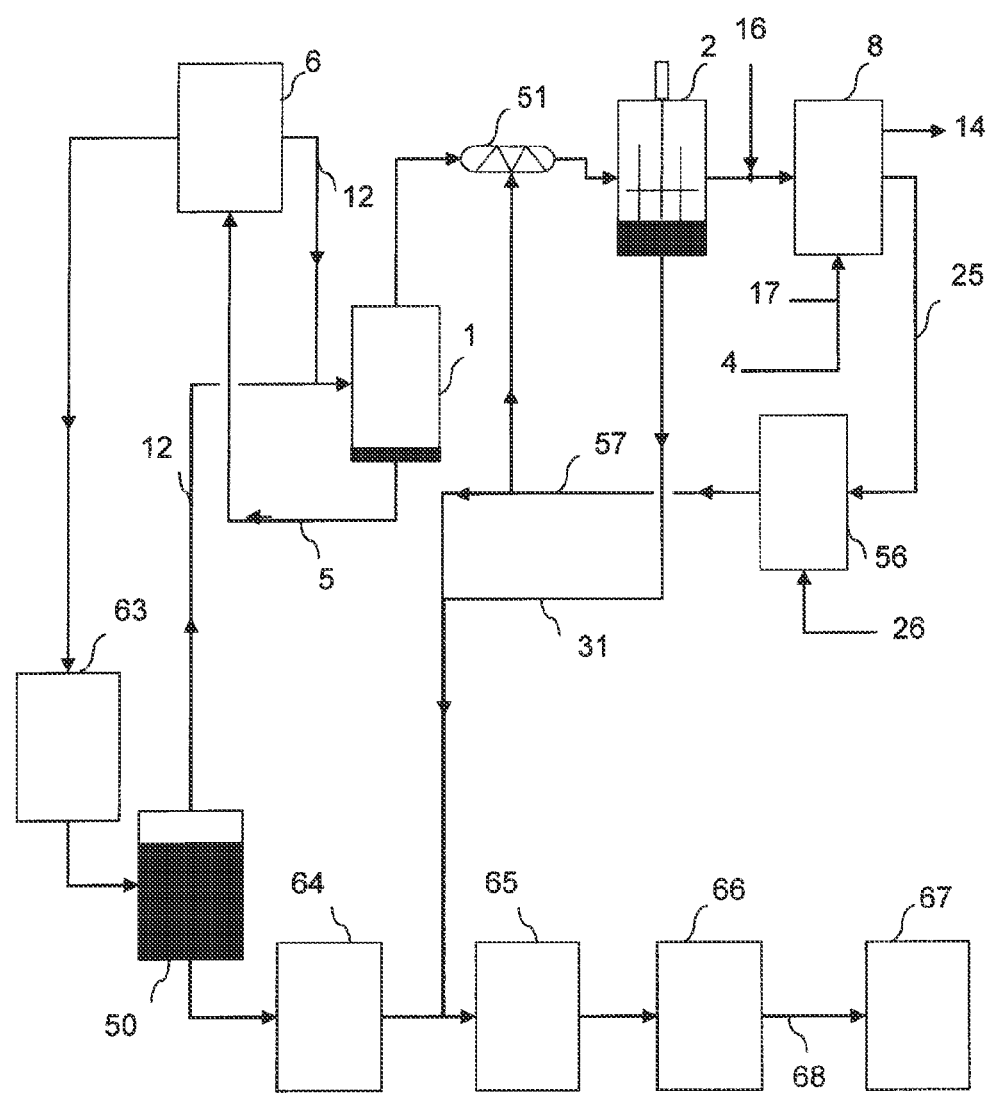
FIG. 12 depicts a black liquor soap washing process where unclarified fortified brine is sent to a black liquor system downstream from multi-effect evaporators and upstream from recovery boners which is consistent with at least one embodiment of the invention.
Figure 13:
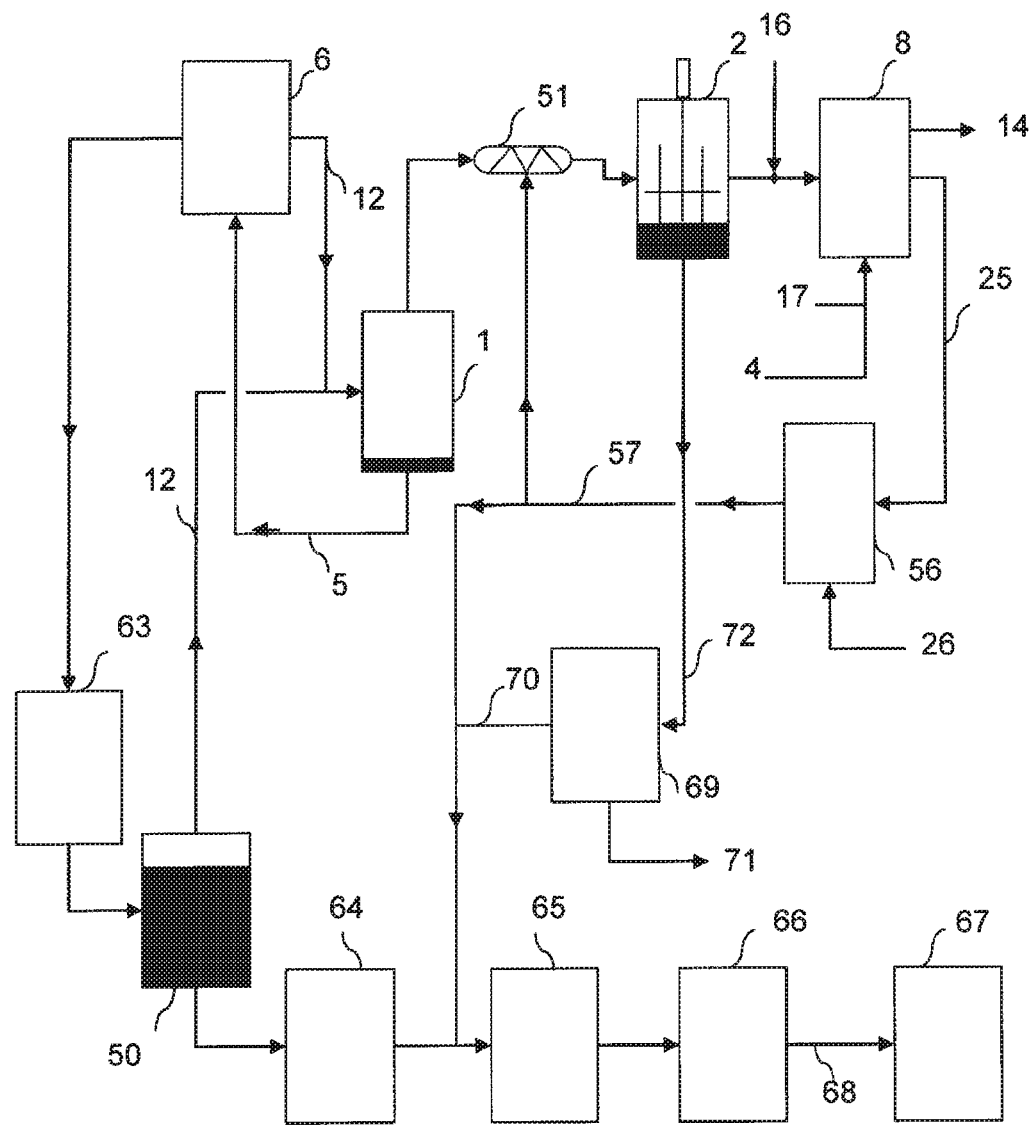
FIG. 13 depicts the same process as in FIG. 12 with the addition of clarification of fortified brine; the process (with the addition mentioned) is consistent with at least one embodiment of the invention.

Thus, in one inventive method, the fortified brine, following its separation from calcium carbonate-containing solids, is transferred to a weak black liquor storage unit of the plant. As shown in FIGS. 11-13, the brine sent there ultimately is concentrated and sent to a recovery boiler for recapture of inorganic salts.

In another aspect, calcium carbonate-containing solids are combined with water to separate calcium carbonate from the more water-soluble lignates (see FIGS. 11-13). The recovered calcium carbonate is then preferably sent to a lime kiln where it is thermally decomposed to calcium oxide (lime) and carbon dioxide. The calcium oxide is then used to convert ("causticize") sodium carbonate obtained from the recovery boiler to the sodium hydroxide needed for the digestion process (see FIG. 7).

The lignite-containing aqueous phase resulting from water washing the calcium carbonate-containing solids can be concentrated to recover lignates either in solid or concentrated aqueous form. The lignates are useful components of a biofuel.

In another inventive method, the mixture resulting from combination of the black liquor soap and alkaline wash medium is separated by centrifugation, decantation, filtration, settling, or a combination of these techniques to provide, in addition to the washed tall oil soap, an unclarified, fortified brine phase (see FIGS. 12 and 13). This phase contains fortified brine, lignates, and calcium carbonate.

FIG. 12 illustrates an embodiment where unclarified, fortified brine phase is sent to a transfer point in the Kraft plant that is downstream from a multi-effect evaporator system and upstream from a recovery boiler in the plant's liquor system. Because the calcium in this unclarified, fortified brine phase is not returned to weak black liquor storage, it cannot become re-entrained in black liquor soap, and it is effectively purged from the system. The calcium carbonate thus goes to the recovery boiler and is recovered with other inorganics. Preferably, the transfer point is upstream from or directly into either a liquid concentrator or a direct contact evaporator (and upstream from the recovery boiler).

In a related method, illustrated by FIG. 13, the unclarified, fortified brine is clarified by settling, centrifuging, filtering, or combinations of these techniques phase to remove calcium carbonate. The resulting clarified, fortified brine is then sent to a transfer point in the Kraft plant that is downstream from a multi-effect evaporator system and upstream from a recovery boiler in the plant's liquor system, as described above.

It may be cost-effective and desirable to avoid clarifying fortified brine (to separate out at least some of the calcium carbonate), particularly if a clarification unit would have to be added to an existing plant. Instead, the calcium carbonate stays suspended in the fortified brine and may be injected into, for example, the strong liquor system going to the liquor concentrators and then to the recovery boiler(s). In the recovery boiler(s), the calcium carbonate would calcine at the high temperature into carbon dioxide and calcium oxide. If later entering a dissolving tank, this calcium oxide would hydrate to calcium hydroxide and may become a reactant along with the sodium carbonate in the green liquor to form sodium hydroxide. Some of the calcium carbonate may also be purged as part of the green liquor dregs or as slaker rejects. This would essentially piggyback the calcium carbonate to the Kraft calcium cycle without actually separating it and pumping it there as a separate entity. This might be a significantly less expensive alternative to a new unit operation that removes the calcium carbonate from the fortified brine, and it may be most applicable in mills that process their own soap and that do not have the high calcium carbonate mass flows associated in the fortified brine as in mills that process a significant amount of tall oil soap from other suppliers.

Acidification of the washed tall oil soap gives crude tall oil, which is isolated, and a spent acid mixture. The acidification is conveniently performed in an acidulation unit that includes an acidulation unit 8 (sometimes identified as a "degas tank reactor"). The washed tall oil soap is preferably combined with water, a surfactant (preferably a polynaphthalene sulfonate), and other well-known additives that facilitate neutralization and separation of the spent aqueous acid from the crude tall oil product. The soap and additives are combined with a mineral acid, usually concentrated (93-98%) sulfuric acid, and steam is advantageously used to maintain an acidulation temperature in the range of 195° F. to 217° F. (90° C. to 103° C.). Acidification converts the soap to crude tall oil. Typically, the product mixture also includes aqueous acidic sodium sulfate brine, precipitated lignin, and may contain other sulfate salts.

Crude tall oil isolated as described above can be distilled and sold for use as is. It can also be fractionated to recover tall oil fatty acids (TOFA), tall oil resin (TOR), and other useful components, including a light cut comprising mostly palmitic acid, an intermediate cut of combined TOFA and TOR, and a bottom fraction known as pitch. CTO, TOFA, TOR, and other components are useful in many end-use applications, including, e.g., bio-lubricants, rubber compounding, alkyd resins, mining or oilfield chemicals, fuels, road construction, adhesives, inks, coatings, and personal care.

The spent acid mixture is adjusted to pH=10 to 14, preferably from 11 to 13, more preferably from 11.5 to 13, by adding a base, preferably sodium hydroxide, and at least a portion of the neutralized spent acid is returned to the first step for use as alkaline wash medium as described above. It may be preferred to use only a portion of the pH-adjusted spent acid for soap washing. Thus, in one approach, the remainder (i.e., the portion not used for soap washing) is combined with fortified brine and sent to the plant's weak black liquor system (see, e.g., FIGS. 8-10). In another approach, the remainder is sent to the transfer point described above that is downstream from the multi-effect evaporator system and upstream from the recovery boiler (see, e.g., FIGS. 11-13).

Those skilled in the art will recognize the need to maintain a safe limit for the solids content of mixtures sent to the recovery boiler. A typical lower limit on solids is 60%, but this may vary. One way to handle this issue is to regulate the amount of transfers such that the solids content of the combined stream leaving the recovery boiler header(s) is above the minimum safe limit associated with the corresponding recovery boiler(s).

The inventive methods can be performed in whole or in part as batch, semi-batch, semi-continuous or continuous processes.

Fortified brine obtained from the inventive methods may be used as, or at least to produce, a biofuel, preferably a lignate-based biofuel. The biofuel is conveniently made from fortified brine by reducing its water content by evaporation or other well-known methods. A low calcium carbonate content in biofuels is usually preferred, so clarification of fortified brine (for example) may be performed if desired.

The following examples merely illustrate the invention. Those skilled in the art will recognize many variations that are within the spirit of the invention and scope of the claims.

DESCRIPTION OF DRAWINGS

FIG. 1-6 refer to the Examples described later in this application.

Figure 7:
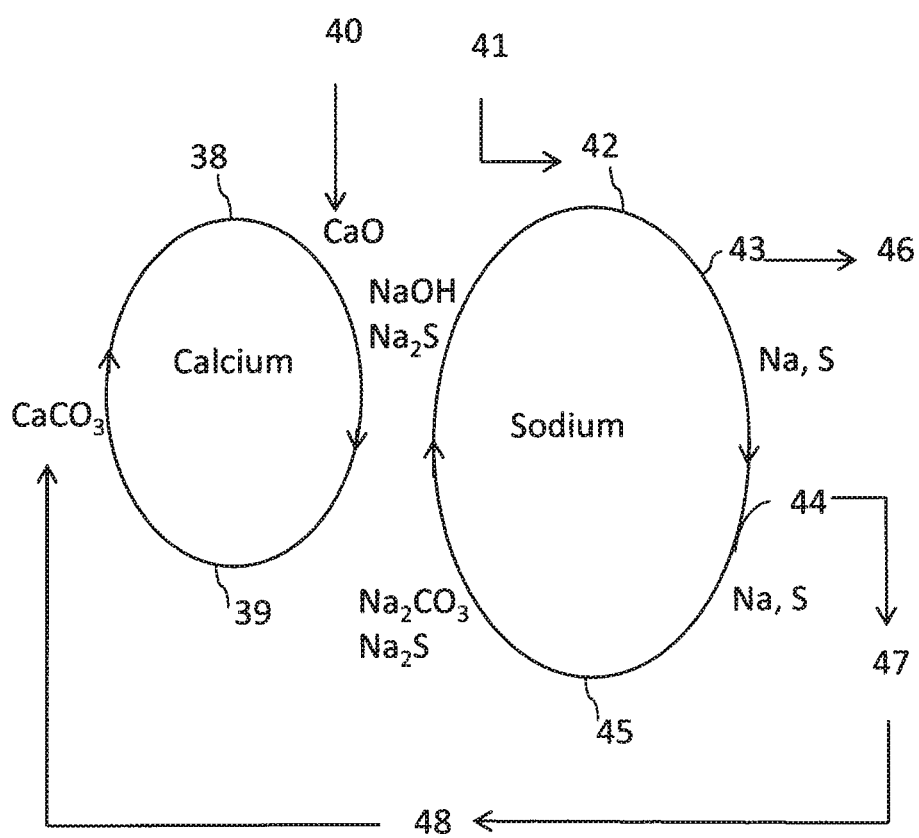
FIG. 7 depicts the sodium and calcium cycles for the Kraft process (simplified) with a calcium purge from a black liquor soap washing process, this purge being consistent with at least one embodiment of the invention.

FIG. 7 depicts a simplified version of calcium and sodium cycles in a Kraft process consistent with at least one embodiment of this invention. An aspect of the inventive method is the opportunity to provide calcium carbonate to a lime kiln at a Kraft plant. Sodium is used in cycles in the Kraft paper system. Referring to FIG. 7, in the Kraft process wood chips 41 are digested in a digester 42 with a mixture of sodium hydroxide and sodium sulfide ("white liquor") and washed to isolate cellulose fibers (the "pulp" 46) from a liquid phase ("black liquor") that contains crude tall oil soap, lignates, carbohydrates, and inorganic salts. Concentration of the black liquor in evaporators 44 allows the soap to be skimmed off and sent to a tall oil process, while the remaining black liquor is further concentrated and eventually burned in a "recovery boiler" 45 to recover the inorganic salts (e.g., sodium carbonate, sodium sulfide). Treatment of these with lime (CaO) 40 regenerates the sodium hydroxide (NaOH) used, along with sodium sulfide, to digest the wood chips.

In one embodiment of inventive method, black liquor soap from the evaporators 44 is washed and the tall oil soap 47 is separated from fortified brine containing lignin and calcium. Calcium carbonate 48 is recovered from fortified brine and lignin and may be sent to a paper mill lime kiln 38. This reduces the make-up lime 40 that the mill needs to have for regenerating sodium hydroxide.

Figure 8:
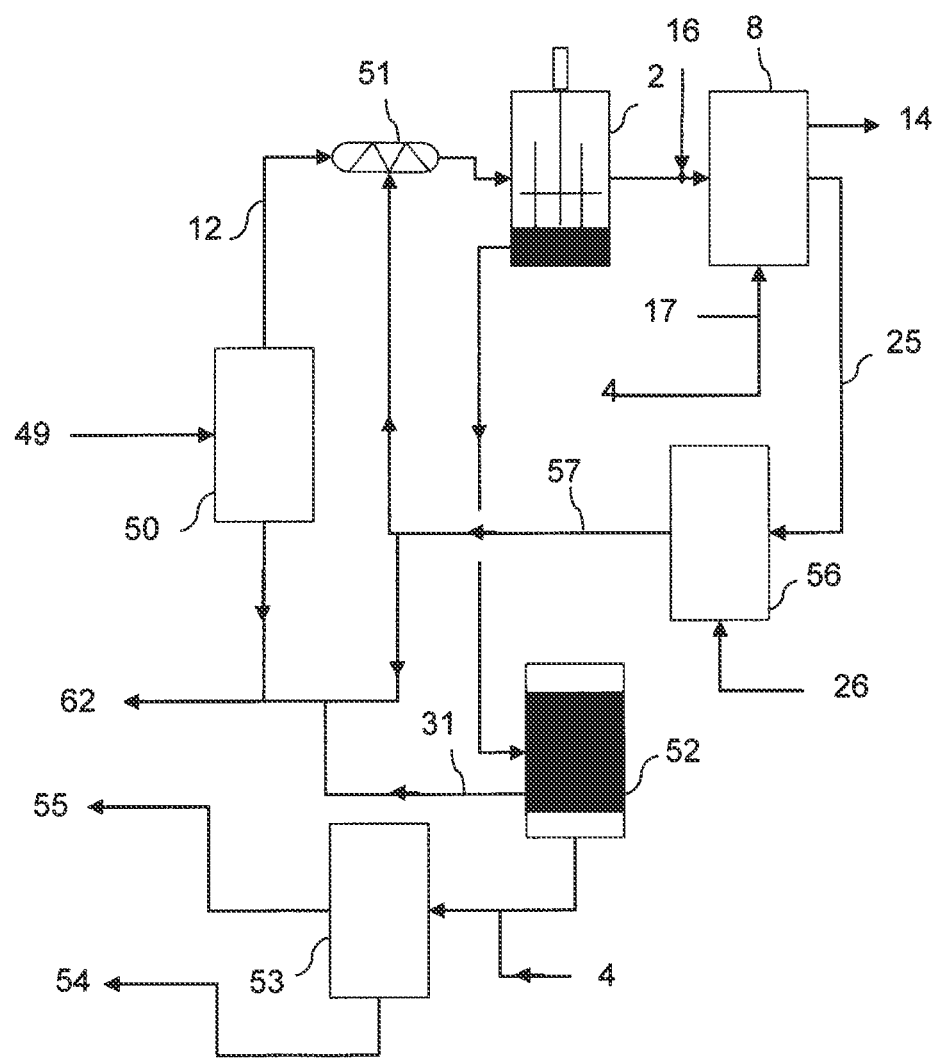
FIG. 8 depicts a black liquor soap washing process employing a rake tank and settler, a process consistent with at least one embodiment of the invention.

FIG. 8 depicts an embodiment of the inventive method, employing a static mixer, a rake tank, and a settler. Soap washing is performed by passing the black liquor soap and alkaline wash medium through a static mixer 51, followed by settling and separation of the washed tall oil soap from fortified brine, lignates, and calcium carbonate in a rake tank 2. The rake tank is a separation equipped with a soap rake, which has a slowly rotating horizontal arm on which tines are vertically mounted. As the tines pass through the mixture, tall oil soap migrates to the liquid surface, while fortified brine, lignates, and calcium carbonate settle to the bottom.

Further separation of calcium carbonate and lignates from the fortified brine is accomplished by removing the bottom layer of the rake tank 2 to another process. For instance, a settler 52 can be used to separate fortified brine from solids (or "mud").

Figure 9:
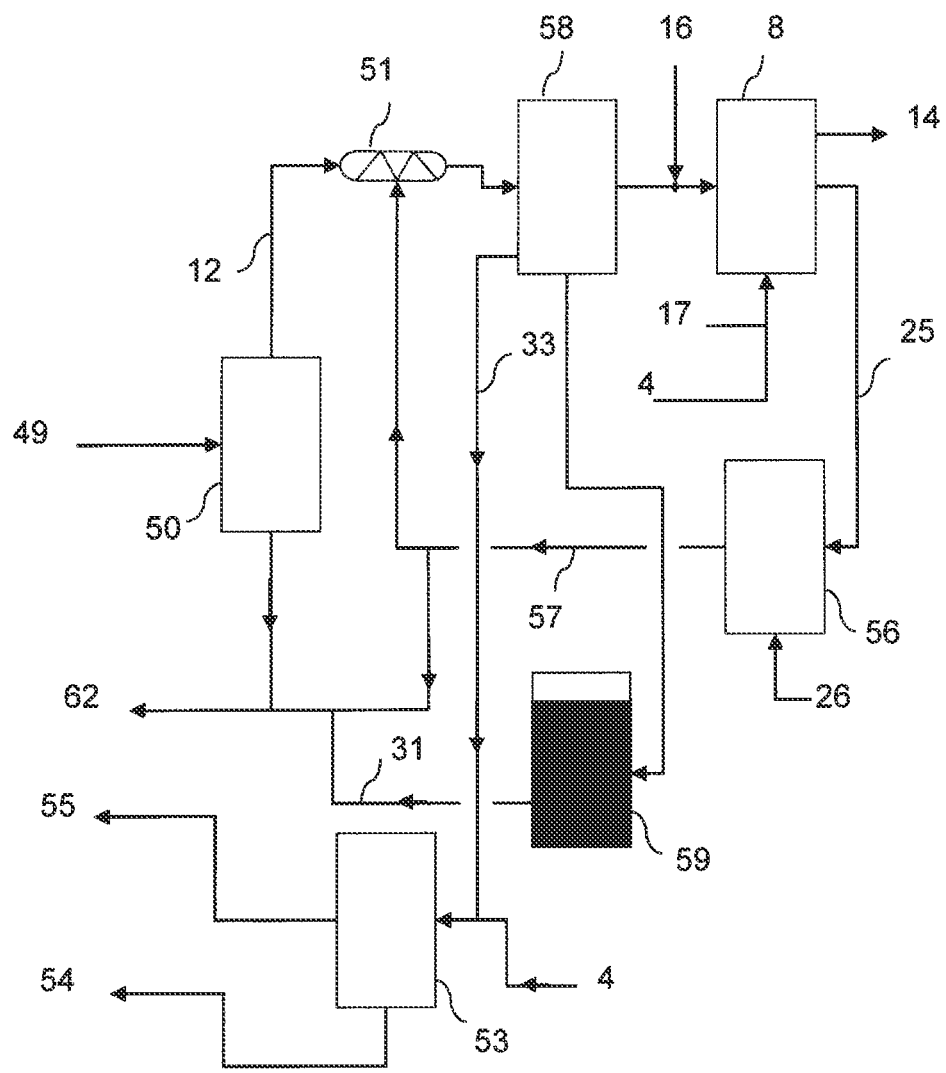
FIG. 9 depicts a black liquor soap washing process employing a three-phase decanting centrifuge, a process consistent with at least one embodiment of the invention.

FIG. 9 depicts an embodiment of the invention in which mixing of the black liquor soap and alkaline wash medium is followed by isolation, using a decanting centrifuge 58, of three separate phases: a solid phase comprising calcium carbonate; a fortified brine phase; and a washed tall oil soap phase. The solid phase is removed in a calcium carbonate shoot stream 33 to a calcium carbonate wash unit 53. Water 4 is added to the calcium carbonate wash unit causing separation of the calcium carbonate from lignates. The lignates in water 55 may be dried and used as a biofuel. The calcium carbonate stream 54 may be sent to a paper mill lime cycle. In this embodiment, the fortified brine phase is sent to fortified brine storage 59. Fortified brine 31 is combined with black liquor from other portions of the process, to evaporators 62 for recovery.

Figure 10:
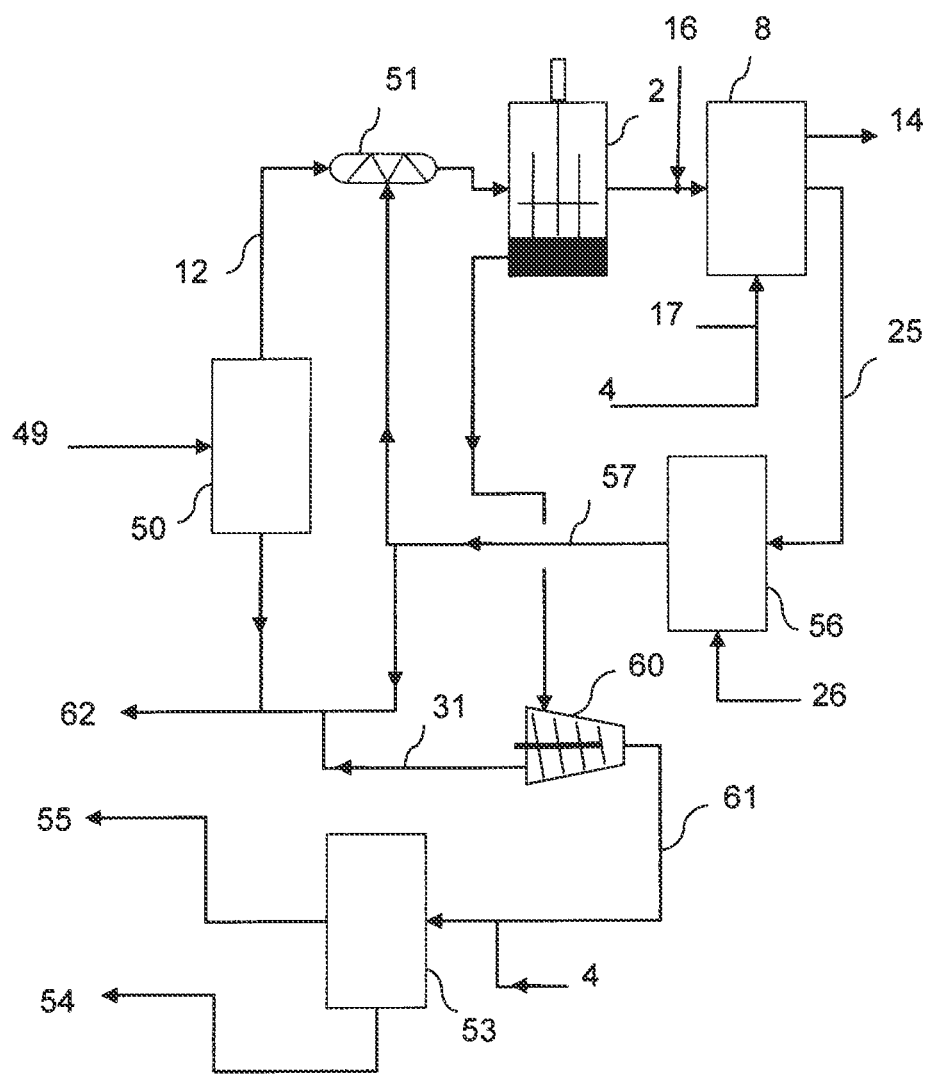
FIG. 10 depicts a black liquor soap washing process employing a rake tank and a two-phase decanting centrifuge, a process consistent with at least one embodiment of the invention.

FIG. 10 depicts are embodiment of the invention, similar to that in FIG. 8. However, following removal of CTO from a rake tank, a two-phase decanting centrifuge can be used to separate fortified brine from the solids.

FIG. 11 depicts an embodiment of the inventive method including a step for clarifying fortified brine coming from the bottom of the settler 52 in a calcium carbonate wash 53. This allows the calcium carbonate to be sent to a mill lime mud washer 54.

FIG. 12 depicts an embodiment of the inventive method including a step where unclarified, fortified brine 31 is sent to a black liquor system. The fortified brine is introduced downstream of multi-effect evaporators 63 and 64, and upstream of a recovery boiler 66. The calcium carbonate is therefore not collected in separate equipment.

FIG. 13 depicts an embodiment similar to FIG. 12, with the addition of a fortified brine clarification unit 69. Unclarified fortified brine 72 is treated with water. Clarified fortified brine 70 can then be sent to to a black liquor system. The fortified brine is introduced downstream of multi-effect evaporators 63 and 64, and upstream of a recovery boiler 66. In this example separated solids 71 are removed from the clarification unit 69.

(COMPARATIVE) EXAMPLE 1

Baseline Soap Acidulation and Tall Oil Recovery Process

Figure 2:
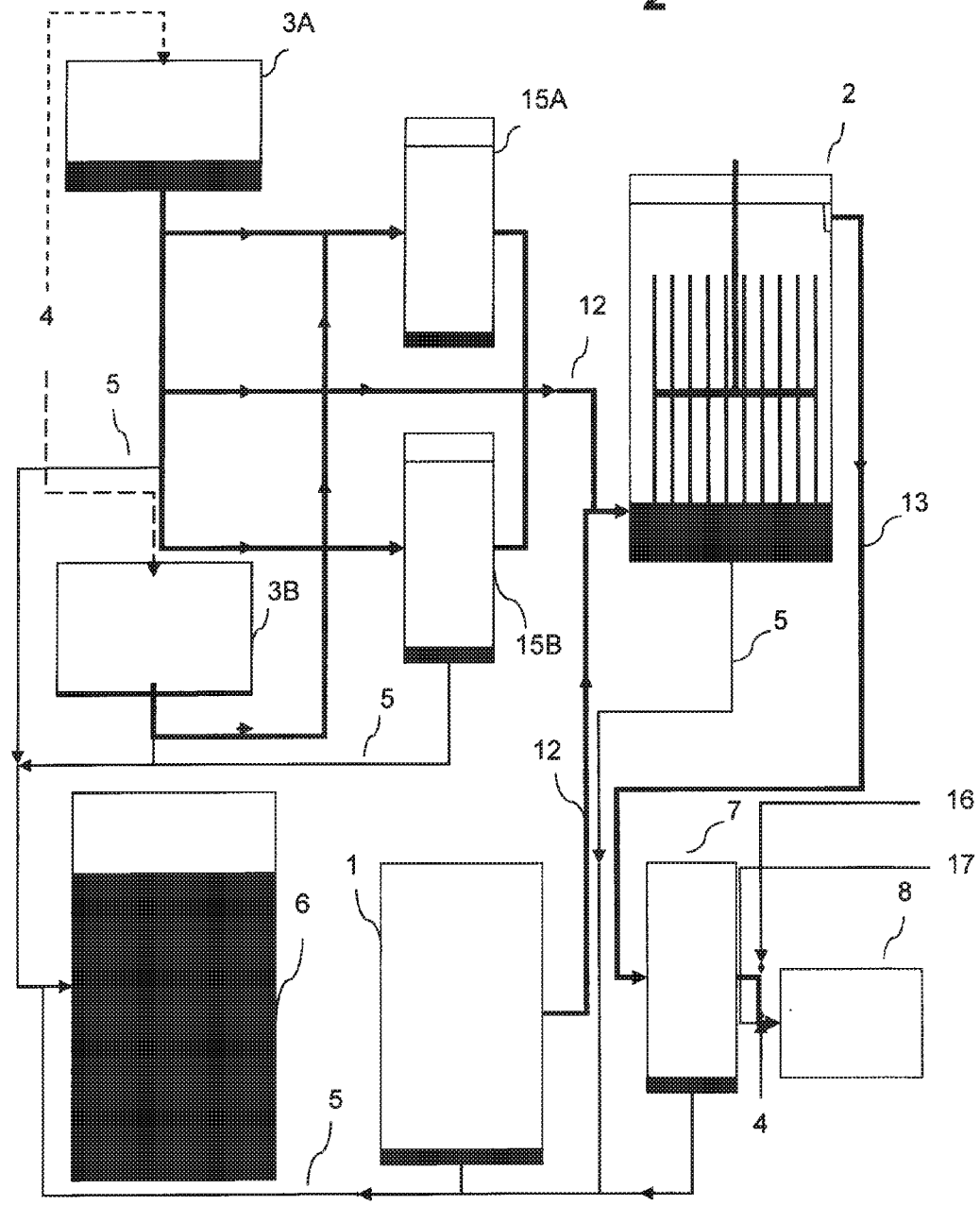
FIG. 2 depicts a schematic of a baseline soap feed system for a tall oil plant consistent with the situation disclosed in (Comparative) Example 1.
Figure 3:
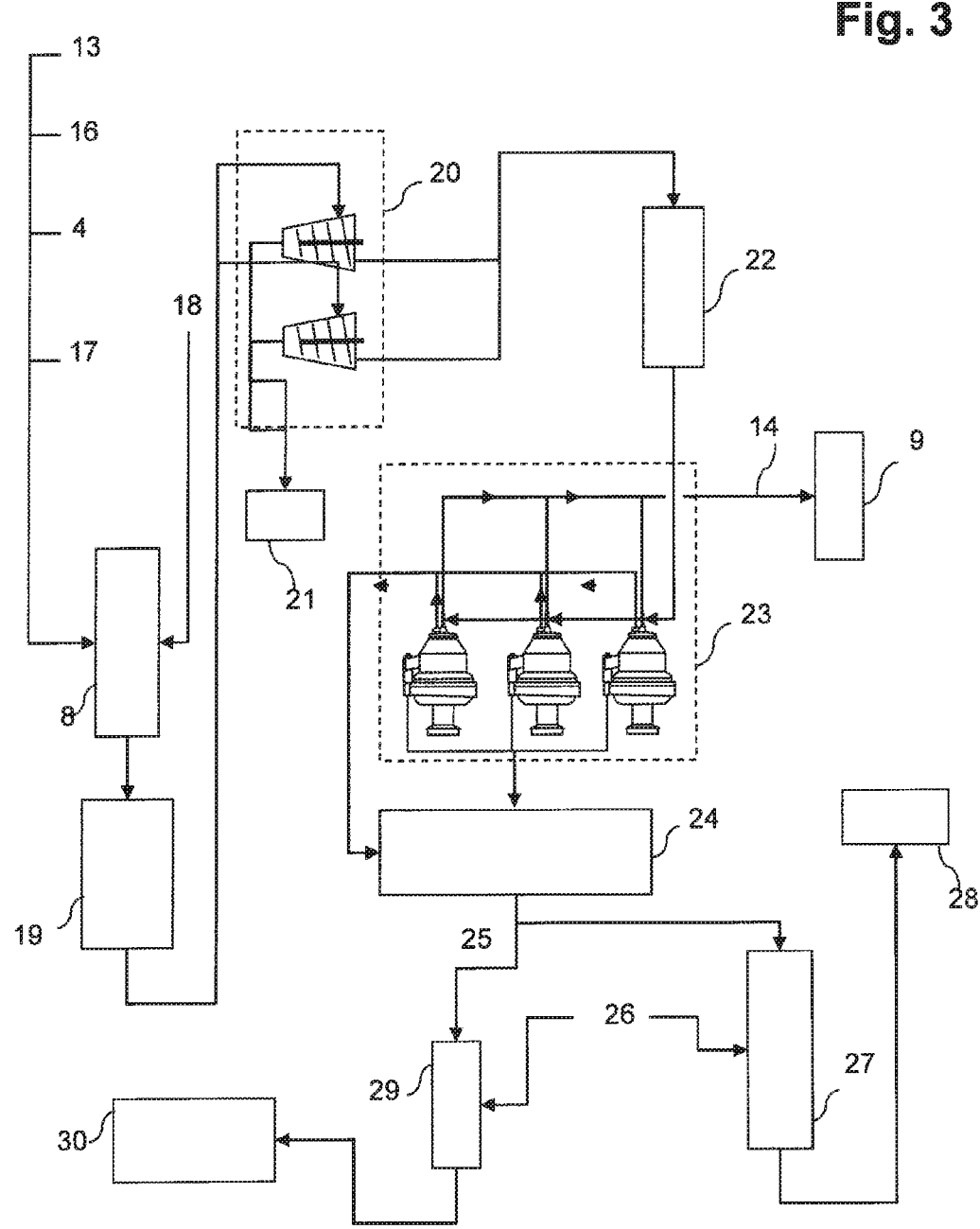
FIG. 3 depicts a schematic of a baseline soap acidulation and phase separation system for a tall oil plant consistent with in (Comparative) Example 1.

Black liquor soap was received from the host mill 1 and was supplied to rake tank 2 along with black liquor soap received from other suppliers in tank trucks and rail cars. The role of tank 2 is discussed below. Reference to FIGS. 1-3 may be helpful.

Soap Unloading

Referring to FIG. 1, before the soap received in rail cars and tank trucks 3a/3b was fully unloaded, black liquor that had separated to the bottom of these transport vessels in transit was drained and pumped to the host mill weak black liquor storage system 6. After the separated and drained liquor was removed, the soap was pumped either directly to tank 2 or into intermediate storage tanks and then eventually combined with soap from the host mill before entering tank 2.

To assist the pumping of the viscous soap from rail cars or tank trucks, water 4 was often added at the pump suction. The added water reduced the soap viscosity thereby significantly decreasing the length of time required to unload the soap.

Soar Raking and Blending

Referring to FIG. 1 and FIG. 2, the soap entered rake tank 2 near the bottom of the tank on the side opposite the outlet ports on the tank. During the residence time in this tank, additional liquor separated from the soap and formed pockets of liquor within the viscous soap bed. Because the soap was less dense than the liquor, the liquor pockets tended to settle to the bottom of the tank. To assist the settling of the liquor pockets, the rake tank 2 was equipped with a soap rake—a slowly rotating horizontal arm on which tines were vertically mounted to pass through the soap. The tines passed through the liquor pockets, and the black liquor drained to the bottom of the tank and formed a reservoir of black liquor. The depth of the black liquor reservoir was controlled so that the soap/liquor interface was maintained within a few inches of the bottom of the soap rake's lower tines.

To control the liquor reservoir depth, the liquor was pumped away intermittently either by operator intervention or based upon output of thermal dispersion sensors that detected whether they were in the soap layer or the liquor layer. The sensors were used to start and stop the liquor return pump to host mill weak black liquor storage tanks.

Drained liquor may have contained high concentrations of soap at times because the water used to assist soap pumping dissolves a portion of the soap, and this solution drains to the bottom of the tank as well.

Referring to FIG. 1 and FIG. 2, the black liquor drained from rake tank 2 was turned to the host mill weak liquor storage system.6

The well-drained tall oil soap 13 overflowed at the top of rake tank 2 and was pumped to a soap feed tank 7 prior to being pumped to the acidulation unit 8 for acidulation. The combined residence time for the soap in the rake tank and the blend tank was approximately 24 hours, ranging from 8 to 72 hours depending upon the consumption rate and other operational issues.

In the soap feed tank 7, the soap was re-circulated and from there it was pumped to the acidulation unit 8. A small amount of liquor was also drained from the bottom of this tank. This liquor was also returned to the host mill weak black liquor storage tanks 6.

Soap Acidulation and Separation

Referring to FIG. 2 And FIG. 3, Soap was pumped using a positive displacement pump through a mass flow meter and was mixed with water 4 and a poly-naphthalene sulfonate (PNS) containing a dispersant 16 (Chemtreat™ TA 110 made by Chemtreat). The dispersant facilitates reaction with of crude tall oil soap with sulfuric acid and assists subsequent phase separation of the reaction products. Similar dispersants by various manufacturers are used widely throughout the industry. The mixture was pumped to an acidulation unit 8 where it was combined with concentrated sulfuric acid (93-98%) and sufficient steam to maintain an acidulation reaction temperature of between 195° F. and 212° F. (90° C. to 100° C.). A mixture comprising crude tall oil (CTO), spent acid (aqueous acidic sodium sulfate brine), precipitated lignin, calcium sulfate, magnesium sulfate, sand, and fiber was produced (in a continuous mode).

Referring to FIG. 3, The reaction product mixture (at pH 2-4) flowed from the acidulation unit 8 to an agitated centrifuge feed tank tank 19 having level control. The mixture from the centrifuge feed tank tank 19 was then pumped to decanting (scoll) centrifuges 20 where precipitated solid material was separated out.

The solid material separated in the decanting centrifuges 20 dropped into collection tubs 21. This mud-like solid material had been de-liquored sufficiently to prevent free liquor drainage as determined by the paint filter test (ASTM STP 933). The contents of these collection tubs was land filled.

The liquid mixture from the scroll centrifuges was sent to another agitated, level controlled collection tank 22. This liquid mixture comprised crude tall oil, acidic sodium sulfate brine and a small amount of finely divided, precipitated solid material. This mixture was then pumped to three high-capacity solids-ejecting centrifuges 23 (Alfa-Laval® centrifuges) operated in parallel and on flow control.

In the ejecting centrifuges 23, the crude tall oil and the acidic sodium sulfate brine were separated out and removed continuously. The crude tall oil was collected in a tank 9, and the "clean" spent acid (acidic sodium sulfate brine understood to have some impurities) was accumulated in "brine collection tank" tank 24. Solid material was accumulated internally on the periphery of the disk stack and ejected on a timed cycle in a "shoot" stream; the timed cycle was determined so as to prevent solids accumulation that would have resulted in excessive vibration of the centrifuges. This solid material was also directed to "brine collection tank" 24 with the clean spent acid (this being baseline operation). The solid material accumulated in the bottom of this tank. During operation in this (baseline) configuration, there were both concentrations of tall oil (1% to 1.5% on a weight basis) and filterable solids in the "clean" spent acid. The tall oil content of the excess spent acid potentially increases the biological oxygen demand on the effluent treatment system to some extent.

The clean spent acid from tank 24 (at about pH 3) was pH adjusted with caustic soda 26 (about 40% NaOH by weight in water) in a causitization unit 27 to about pH 12. Excess clean spent acid was pH adjusted similarly in neutralization unit 29 to about pH 6 for disposal.

The following table summarizes inputs and results from baseline operation.

| Sources | Baseline Operation | | | |
|---|---|---|---|---|
| | Net Soap from Each Supplier | Soluble Ca Composites (ppm) | In-soluble Ca (ppm) | Total Ca Composites (ppm) |
| Mill P | 7% | 751 | 2067 | 2818 |
| Mill G | 14% | 507 | 1427 | 1934 |
| Mill R | 14% | 215 | 1585 | 1800 |
| Mill C | 11% | 241 | 1643 | 1884 |
| Mill N | 4% | 135 | 815 | 950 |
| Mill F | 9% | 128 | 362 | 490 |
| Mill W | 7% | 290 | 862 | 1152 |
| Mill I | 8% | 282 | 2256 | 2538 |
| Mill E | 6% | 351 | 1916 | 2267 |
| Mill S | 20% | 404 | 1760 | 2164 |
| Total | 100% | 345 | 1,524 | 1,869 |
| Measured in Water Transfer Soap Composite | | 255 | 1595 | 1850 |
| Alkaline Brine Ca | | 224 | 564 | 788 |

EXAMPLE 2

Figure 4:
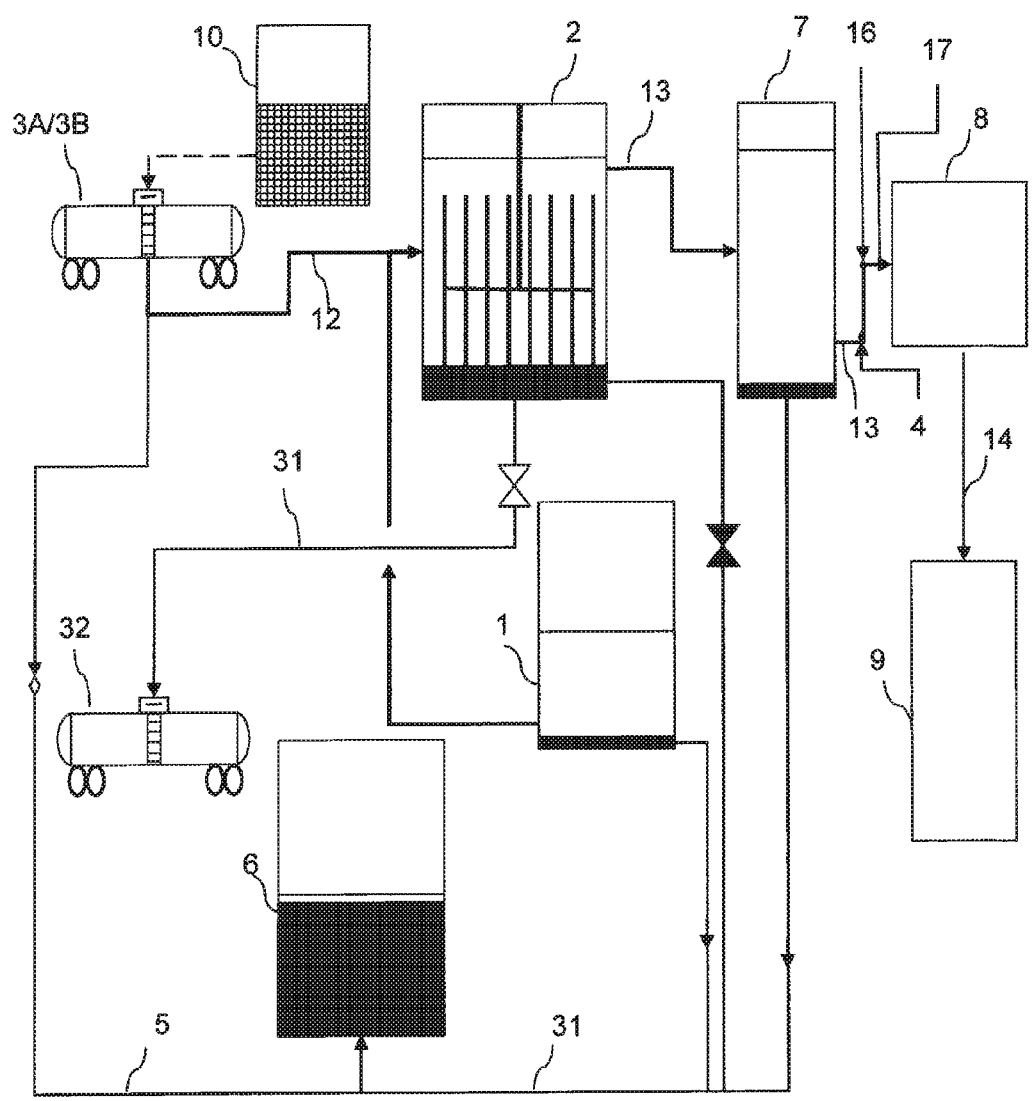
FIG. 4 depicts schematic of a soap washing process described in Example 2.
Figure 5:
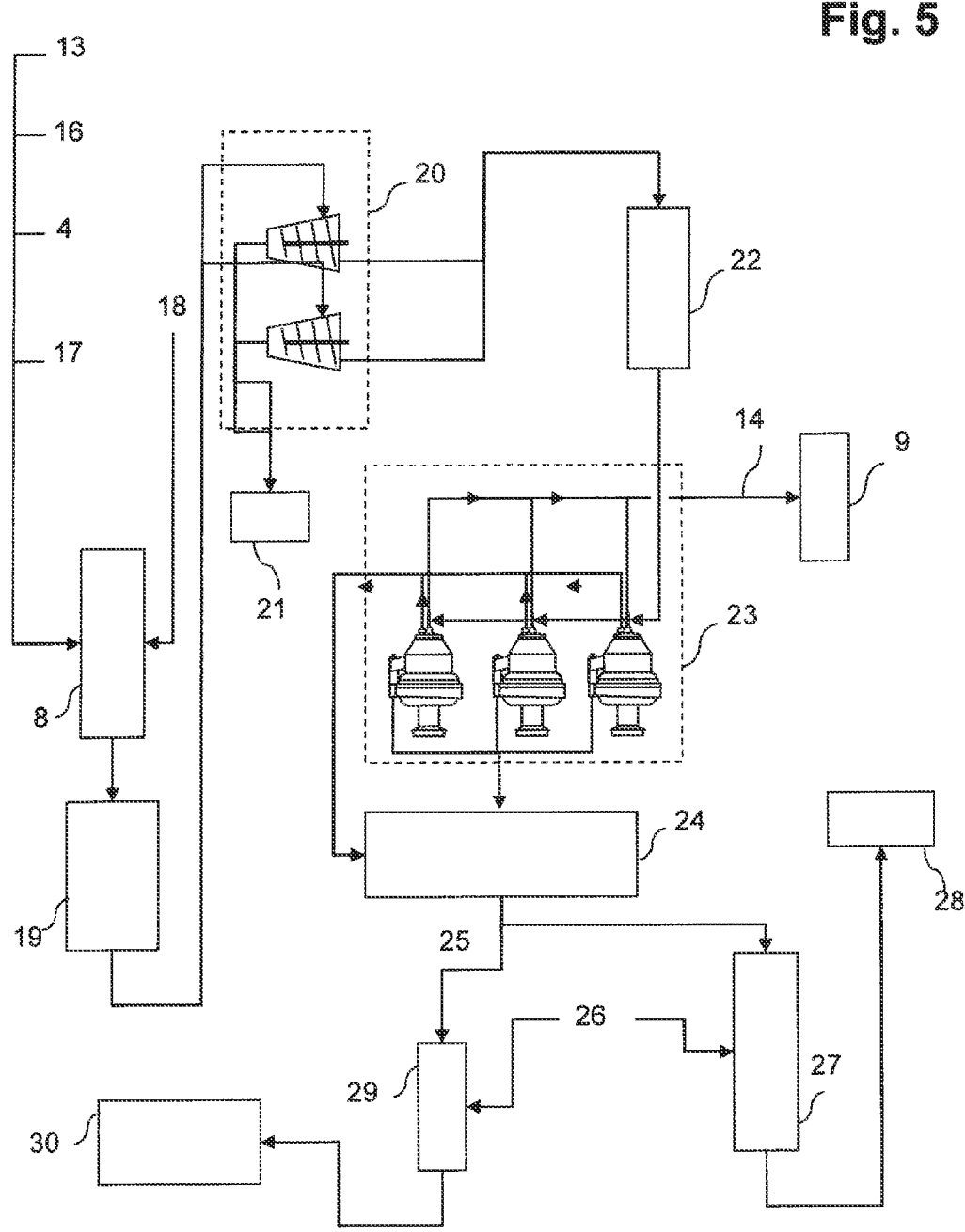
FIG. 5 depicts a schematic of a soap acidulation and phase separation system for a tall oil plant consistent with the situation disclosed in Example 2.
Figure 6:
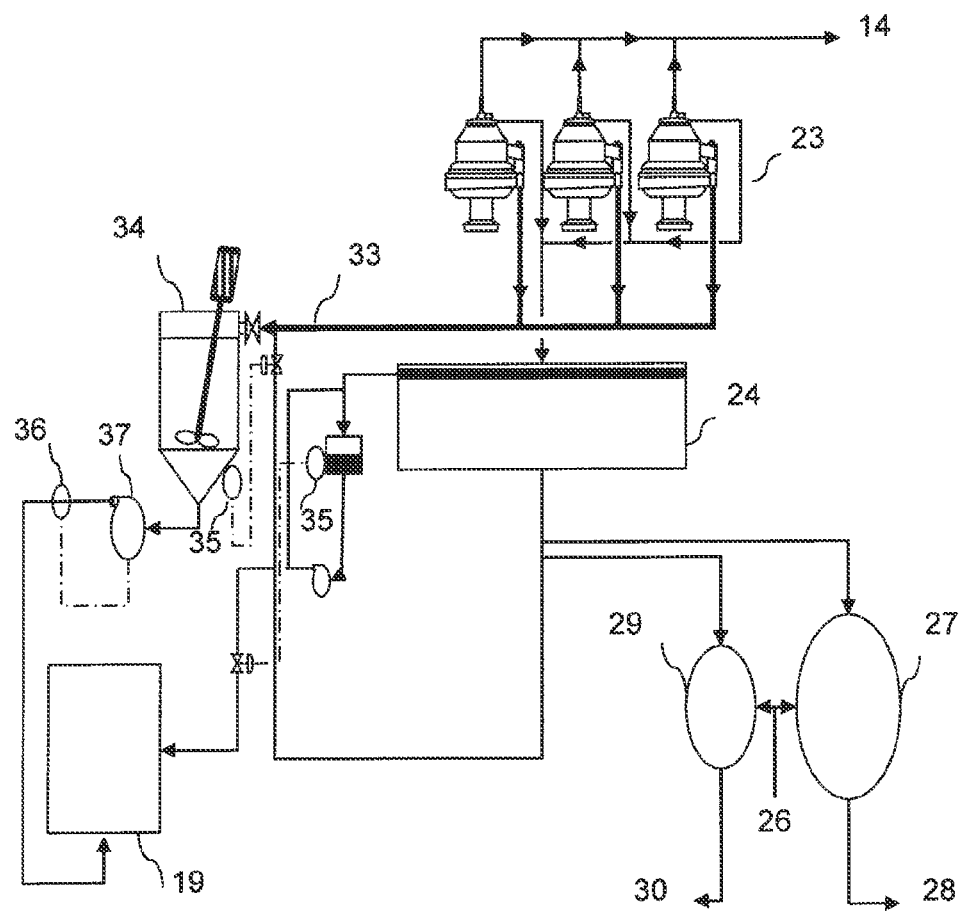
FIG. 6 depicts a schematic of trial shoot phase segregation configuration for a tall oil plant consistent with the situation disclosed in Example 2.

Soap Washing Trial (see FIGS. 4-6)

To test the invention, water used in unloading the tall oil soap was replaced with "clean" alkaline tall oil plant brine from causticization unit 27 at about pH 12 ("dean" here meaning low filterable solids and low lignate; in this example, this measured less than 30 ppm filterable solids and less than 0.6 weight % lignates. The ratio of "clean" alkaline tall oil plant brine wash media to soap in the trial was about 0.25:1.00 by weight. This trial was run for 3 days; about 2 of these days were believed needed to ensure that any unwashed soap in the system at the start was flushed out.

Referring to FIG. 6, in this example, unlike in the previous, a high-solids shoot stream from the ejecting centrifuges 23 was diverted away from flowing into brine collection tank 24 and collected in an agitated shoot collection tank 34, instead (see FIG. 6). About 10 gpm (40 L/min.) of the clean spent acid from the brine collection tank 24 was sent to the agitated shoot collection tank 34, and the resulting mixture was pumped into the feed to the scroll centrifuges where solids were removed.

Any crude tall oil (CTO) entrained in the dean spent acid readily floated to the surface of tank 24. By increasing the level in tank 24 and allowing it to overflow (decant) into a collection tank, this CTO was removed from the clean spent acid. The CTO material in collection tank was recycled to the decanting centrifuges 20 and was subsequently reclaimed by the high capacity solids ejecting centrifuges 23 thereby increasing the CTO recovered and sent to crude tall oil storage 9. This operating configuration also resulted in lowering the tall oil content in the spent acid that was returned in the alkaline tall oil plant brine (at pH 12) and in the corresponding pH 6 brine directed to disposal.

Using the "dean" alkaline tall oil plant brine (dean spent acid adjusted to pH 12 in causticization unit 27) instead of water to assist soap unloading reduced the quantity of soap re-dissolved for return to a paper mill. Some removal of lignin is possible by increasing the amount of alkaline tall oil plant brine used beyond the minimum amount required for soap transport, and using an internal gear soap pump to mix this alkaline brine with the soap. This material would produce a biofuel material containing the extracted lignin and may be useful to a mill.

During this example process, tall oil soap and "clean" alkaline tall oil plant brine mixture was allowed to settle in the rake tank 2. Fortified brine accumulated in the bottom of the rake tank 2, and the de-liquored soap at the top was pumped to the soap fee tank 7 supplying the acidulation system. The extract brine drained from the rake tank 2 bottom was sampled and accumulated in two rail cars for evaluation.

The method of this invention does not appear to require deliberate cooling for washing black liquor soap. Temperatures in the various streams recited in this example were estimated to have all fallen in a range of about 116° F. to 150° F. (43.3° C. to 65.6° C.), unless otherwise noted; no deliberate coding was employed in the soap washing itself (or mixing for this washing), and none of any significance should have occurred there.

Results

In Example 1, the tall oil content of spent acid decreased to 0.65 wt. % from 1.05 wt. % (baseline).

There was no significant calcium sulfate accumulation/plugging in the collection tank (which collected CTO-rich layer from brine collection tank 24). In contrast, during baseline operation, when the collection tank was operated to collect the overflow tall oil/spent acid for recycle and tall oil recovery, the calcium sulfate accumulation in this tank was so rapid that the outlet plugged in a matter of hours. It was significantly easier to maintain a slight negative pressure on the gas scrubber (likely due to less carbon dioxide formation from calcium carbonate acidification, since much of the calcium carbonate was removed in the soap washing). There was only slightly more sludge accumulated in the tubs 21 versus baseline operation.

Heating value is a measure of lignin or lignate available in solution. The fortified brine solids content in Example 2 was about 21%, compared to 15% in the alkaline tall oil plant brine used for washing. The heating value of the fortified brine was about 4500 BTU/lb. (10467 kJ/kg) of dry solids compared to about 1000 BTU/lb. (2326 kJ/kg) of dry solids in the tall oil plant brine used for washing. This would suggest that lignin and other solids were removed from the soap during soap washing.

Use of the larger flow of alkaline brine to extract liquor from the soap (see above) decreased the soap unloading rate from the rail cars because the soap unloading pumps are positive displacement pumps. This lowered the soap acidulation rate a little over 5% compared to baseline operation. However, the tall oil production rate was unchanged. In effect, the tall oil plant efficiency increased a little over 5% compared to baseline operation. The tall oil content of the "as received" soap was the same in both the baseline operation and during the trial period. There was no significant reduction in the acid consumption per ton (per kg) of tall oil produced.

As noted above, the calcium sulfate mud accumulation was not much different during the trial than during the baseline period. Analysis of the soap supplying the reactor showed that the calcium content of this soap was about 45% lower during the trial period. As would be expected, the calcium content of the extract brine (about 7300 ppm) was much higher than in the corresponding alkaline tall oil plant brine. Typically, alkaline tall oil plant brine has much higher calcium levels than what was seen in this trial. The material precipitated to the bottom of the 2 soap rake tank was primarily calcium carbonate removed from the soap. About 99% of the calcium in the extract brine was as a precipitate layer at the bottom of this brine.

The following table summarizes inputs and results from this trial operation. Following this is a table presenting a calcium balance for the trial. Finally, a table is presented for calcium in the extract brine for the trial.

| Sources | Trial | | | |
|---|---|---|---|---|
| | Net Soap from Each Supplier | Soluble Ca Composites (ppm) | Insoluble Ca (ppm) | Total Ca Composites (ppm) |
| Mill P | 7% | 751 | 2067 | 2818 |
| Mill G | 19% | 507 | 1427 | 1934 |
| Mill R | 4% | 215 | 1585 | 1800 |
| Mill C | 0% | 241 | 1643 | 1884 |
| Mill N | 10% | 135 | 815 | 950 |
| Mill F | 15% | 128 | 362 | 490 |
| Mill W | 14% | 290 | 862 | 1152 |
| Mill I | 9% | 282 | 2256 | 2538 |
| Mill E | 10% | 351 | 1916 | 2267 |
| Mill S | 13% | 404 | 1760 | 2164 |
| Total | 100% | 338 | 1,343 | 1,681 |
| Measured in Washed Soap Composite | | 223 | 802 | 1025 |
| Change | | 115 | 541 | 656 |
| Acidulation Efficiency Increase Relative to Baseline | 5% | | | |

EXAMPLE 2

Calcium Balance

| | | Soluble Calcium (kg) | Insoluble Calcium (kg) | Total Calcium (kg) |
|---|---|---|---|---|
| Truck and Rail car Net Soap Processed | Calcium In | 843 | 3,726 | 4,569 |
| Clean Alkaline Brine Used | Calcium In | 79 | 192 | 270 |
| Total In | | 922 | 3,918 | 4,839 |
| Soap To Acidulation Unit | Calcium Out | 544 | 1,957 | 2,501 |
| Extract Brine Generated | Calcium Out | 27 | 2,460 | 2,487 |
| Total Out | | 571 | 4,416 | 4,988 |
| Total Calcium Balance Closure | | | | 103% |

EXAMPLE 2

Calcium in Extracted Brine

Calculated Ca in Extracted Brine (ppm) 6,035

| | Minimum | Maximum | Soluble Calcium ppm | Insoluble Calcium ppm | Total Calcium ppm |
|---|---|---|---|---|---|
| Measured Ca in Extracted Brine (ppm) | 5,000 | 15,600 | 80 | 7,177 | 7,256 |
| Measured Ca in Extracted Brine Supernatant (ppm) | | | 40 | 0 | 40 |
| Measured Ca in Extracted Brine Centrifuge Sludge (ppm) | | | | 342,000 | |

EXAMPLE 3

Determination of (Total) Filterable Solids and Inorganic Filterable Solids in Clean Spent Acid (Adapted from TAPPI T635 om-89)

Total Filterable Solids

The dean spent add filterable solids determination was performed as described below. To an accurately weighed Buchner filter (approx. 5.8 cm i.d.), a 5.5-cm G6 Fisher-brane® glass fiber filter circle that was maintained in a desiccator was added, and the Buchner filter and filter circle were accurately weighed on an analytical balance, The Buchner filter and the glass fiber filter circle were placed on a 500-mL Erlenmeyer filter flask connected to a vacuum source.

About 50 mL of a thoroughly agitated sample of clean spent add were poured into a 100-mL beaker that had been tared, and the sample was accurately weighed.

After wetting the glass fiber circle in the Buchner filter with about 5 mL of de-ionized water, the clean spent add sample in the beaker was poured into the Buchner filter. The beaker was rinsed with de-ionized water several times, and the rinsings were also transferred into the Buchner filter. The liquid was allowed to completely pass through the filter circle and then the walls of the filter and filter pad were rinsed with de-ionized water (3×5-10 mL) to remove any water-soluble material.

To remove any crude tall oil that might have adhered to the solids on the filter pad, the filter pad in the Buchner filter was rinsed with anhydrous ethyl ether (3×10 mL). After each 10-mL ether rinse, the filter pad was allowed to drain until no free liquid was visible.

After the third ether rinse, the Buchner filter, filter circle and retained solids were placed in a drying oven for 2 h at 105° C. The Buchner filter, filter circle and retained solids were removed and allowed to cool for 30 min. in a desiccator and then weighed immediately the analytical balance.

Calculations for One Run of the Above Procedure:

| | |
|---|---|
| Buchner filter + Glass Fiber Circle: | 15.6521 g |
| Buchner filter: | 15.5142 g |
| Glass Fiber Circle: | 0.1379 g |
| Buchner filter + Glass Fiber Circle + Dried Sample: | 15.9686 g |
| Buchner filter + Glass Fiber Circle: | 15.6521 g |
| Filterable Solids: | 0.3165 g |
| Wet Sample Weight: | 74.0000 g |
| Filterable Solids: 0.3165/74.000 * 100% = 0.4277% (4277 ppm) | |

Inorganic Filterable Solids

To determine the inorganic filterable solids content of the clean spent acid, a dry porcelain crucible that was kept in a desiccator was weighed accurately. Then the glass fiber circle and dried sample were removed from the Buchner filter (from the total filterable solids determination above) and placed in the crucible. The crucible containing the glass fiber circle and filterable solids were placed in a muffle furnace at 750° C., and the organic material was allowed to burn off. After 4 h, the crucible and its contents were removed from the muffle furnace, placed in a desiccator and allowed to cool to room temperature for about 45 min. The crucible and the remaining contents were then accurately weighed.

Because residue of the filterable solids remained in the Buchner filter immediately after transfer of the glass fiber circle and dried sample to the crucible, the Buchner filter containing the un-transferred residue was also weighed.

Calculations for One Run of the Above Procedure:

| | |
|---|---|
| Buchner Filter + Un-transferred residue: | 15.5199 g |
| Buchner filter: | 15.5142 g |
| Un-transferred residue: | 0.0057 g |
| Crucible: | 18.0464 g |
| Glass Fiber Circle (see filterable solids determination): | 0.1379 g |
| Crucible + Glass Fiber Circle: | 18.1843 g |
| Crucible + Contents after Incineration: | 18.1857 g |
| Crucible + Glass Fiber Circle: | 18.1843 g |
| Inorganic filterable solids: | 0.0014 g |
| Inorganic filterable solids: | |
| 0.0014 * 0.3165/(0.3165 − 0.0057)/74.0000 * 100% = 0.0019% (19 ppm) | |

EXAMPLE 4

Prophetic

Determination of (Total) Filterable Solids, Inorganic Filterable Solids and Lignates in Alkaline Tall Oil Plant Brine (adapted from TAPPI T620 cm-83)

The procedures in the previous example are based upon using clean spent acid, but they can also be performed using alkaline tall oil plant brine. The brine is first acidified to pH 3 (the usual pH of clean spent acid) using reagent grade, concentrated hydrochloric acid, and then the steps as for the clean spent acid are performed as in the previous example. Subtracting the inorganic filterable solids then found from the (total) filterable solids gives the filterable organic solids. The filterable organics are often nearly all lignin and would correspond to the lignates in the alkaline tall oil plant brine (before acidification). A more accurate measure of lignates in the alkaline brine could be found by determining (total) filterable solids with and without first acidifying and calculating. The lignates (noting that the molecular weight of lignin and corresponding lignate ions are about the same) are determined by subtracting the (total) filterable solids of an unacidified sample from that of the acidified sample of the same alkaline brine. Of course, the results should be the same for filterable inorganic solids whether the testing is performed on an acidified or unacidified sample of alkaline tall oil plant brine, but to be on the safe side, the results from the unacidified sample are taken to be the most accurate.

The preceding examples are meant only as illustrations. The following cla define the invention.

| Key to Figures 1-13 | |
|---|---|
| 1 | mill soap tank |
| 2 | rake tank |
| 3A/B | rail car/tank truck |
| 4 | water |
| 5 | drained black liquor |
| 6 | weak black liquor storage |
| 7 | soap feed tank |
| 8 | acidulation unit |
| 9 | crude tall oil storage |
| 10 | alkaline brine tank |
| 11 | rail car/tank truck for alkaline brine |
| 12 | black liquor soap |
| 13 | tall oil soap |
| 14 | crude tall oil |
| 15A/B | soap storage |

-continued

Key to Figures 1-13

| | |
|---|---|
| 16 | dispersant |
| 17 | sulfuric acid |
| 18 | steam |
| 19 | decanting CF feed tank |
| 20 | decanting centrifuges |
| 21 | landfill |
| 22 | Agitated, level-controlled tank |
| 23 | High capacity, solids ejecting centrifuges |
| 24 | brine collection tank (spent acid collection tank) |
| 25 | spent acid |
| 26 | caustic (NaOH) |
| 27 | causticization unit (to pH 12) |
| 28 | to mills/suppliers |
| 29 | neutralization unit (to pH 6) |
| 30 | disposal |
| 31 | fortified brine |
| 32 | rail car/tank truck for fortified brine |
| 33 | CaCO$_3$ solid shoot stream |
| 34 | Agitated shoot collection tank |
| 35 | level-indicating controller |
| 36 | flow-indicating controller |
| 37 | variable frequency drive |
| 38 | lime kiln |
| 39 | causticizing plant |
| 40 | make-up CaO |
| 41 | wood |
| 42 | digester |
| 43 | washing |
| 44 | evaporators |
| 45 | recovery boiler |
| 46 | pulp |
| 47 | soap |
| 48 | calcium purge from soap washing |
| 49 | black liquor from mill |
| 50 | soap skimmer |
| 51 | static mixer |
| 52 | settler (CaCO$_3$ removal) |
| 53 | CaCO$_3$ washing unit |
| 54 | CaCO$_3$ to mill lime mud washer |
| 55 | water/sodium lignates |
| 56 | spent acid neutralization |
| 57 | alkaline wash media |
| 58 | three-phase decanting centrifuge |
| 59 | fortified brine storage |
| 60 | two-phase decanting centrifuge |
| 61 | contaminated CaCO$_3$ sludge |
| 62 | skimmed black liquor to evaporators |
| 63 | initial multiple effect evaporation |
| 64 | final multiple effect evaporation |
| 65 | liquor concentrators |
| 66 | recovery boiler |
| 67 | caustic plant |
| 68 | green liquor |
| 69 | fortified brine clarification unit |
| 70 | clarified fortified brine |
| 71 | separated solids |
| 72 | unclarified fortified brine |

We claim:

1. A method for producing crude tall oil from black liquor soap while removing calcium and lignates, comprising:
   (a) combining a black liquor soap comprising tall oil soap, lignates. and inorganic solids comprising calcium carbonate, with an alkaline wash medium, wherein the alkaline wash medium has a pH from 10 to 14 and a lower concentration of lignates and inorganic solids than the black liquor soap, at a temperature within the range of 25° C. to 100° C. to produce a mixture comprising washed tall oil soap, fortified brine, lignates, and calcium carbonate; wherein the alkaline wash medium has a lignate content <1.0 wt. % and a filterable inorganic solids content <200 ppm:
   (b) separating the mixture by centrifugation, decantation, filtration, settling, or a combination of these techniques to provide, in addition to the washed tall oil soap:
      (i) a solid phase comprising calcium carbonate, and a liquid phase comprising fortified brine; or
      (ii) an unclarified, fortified brine phase;
   (c) acidifying the washed tall oil soap isolated in step (b) to give crude tall oil and a spent acid mixture; and
   (d) isolating the crude tall oil.

2. The method of claim 1 further comprising
   (e) adjusting the pH of the spent acid mixture to be within the range of pH =10 to 14 and returning at least a portion of it to step (a) as alkaline wash medium.

3. The method of claim 1 further comprising transferring the fortified brine to a weak black liquor storage unit.

4. The method of claim 1 further comprising washing the solid phase with water to give calcium carbonate and an aqueous lignate phase.

5. The method of claim 4 further comprising converting the calcium carbonate to lime for use in a Kraft process.

6. The method of claim 4 further comprising recovering lignates from the aqueous lignate phase for use as a biofuel component.

7. The method of claim 1 wherein the unclarified, fortified brine phase is sent to a transfer point in a Kraft plant that is downstream from a multi-effect evaporator system and upstream from a recovery boiler in the plant's liquor system.

8. The method of claim 7 wherein the transfer point is upstream from or directly into either a liquor concentrator or a direct contact evaporator and is upstream from the recovery boiler.

9. The method of claim 1 wherein the unclarified, fortified brine phase is clarified by centrifugation, decantation, filtration, settling, or a combination of these techniques to remove calcium carbonate and recover a clarified, fortified brine.

10. The method of claim 9 wherein the clarified, fortified brine is sent to a transfer point in a Kraft plant that is downstream from a multi-effect evaporator system and upstream from a recovery boiler in the plant's liquor system.

11. The method of claim 1 wherein the amount of alkaline wash medium is within the range of 1 to 60 wt. % based on the combined amounts of black liquor soap and alkaline wash medium.

12. The method of claim 1 wherein the alkaline wash medium has a lignate content within the range of 0.01 to 0.9 wt. % and a filterable inorganic solids content within the range of 10 to 175 ppm.

13. The method of claim 1 wherein step (a) is performed at a temperature within the range of 55° C. to 95° C.

14. The method of claim 1 wherein the alkaline wash medium has a pH within the range of 10.0 to 11.5.

* * * * *